United States Patent [19]
Miyata

[11] Patent Number: 4,558,102
[45] Date of Patent: Dec. 10, 1985

[54] METHOD FOR CURING HALOGEN-CONTAINING RUBBER COMPOSITION

[75] Inventor: Shigeo Miyata, Takamatsu, Japan

[73] Assignee: Kyowa Chemical Industry Co., Ltd., Tokyo, Japan

[21] Appl. No.: 636,710

[22] Filed: Aug. 1, 1984

Related U.S. Application Data

[63] Continuation-in-part of Ser. No. 505,291, Jun. 17, 1983, abandoned.

[30] Foreign Application Priority Data

Jun. 18, 1982 [JP]  Japan ............................... 57-103907

[51] Int. Cl.⁴ ............................................. C08C 19/00
[52] U.S. Cl. .................................... 525/348; 524/424; 525/352; 525/370; 525/374
[58] Field of Search ............... 525/348, 352, 362, 363, 525/374, 379; 528/485

[56] References Cited

U.S. PATENT DOCUMENTS

| | | | |
|---|---|---|---|
| 3,809,672 | 5/1974 | Stivers | 525/363 |
| 4,284,762 | 8/1981 | Miyata et al. | 528/485 |
| 4,431,776 | 2/1984 | Honsberg | 525/194 |

*Primary Examiner*—Christopher A. Henderson
*Attorney, Agent, or Firm*—Sherman & Shalloway

[57] ABSTRACT

A curable rubber composition composed of a halogen-containing rubber and at least one member selected from the group consisting of a vulcanizing agent and a vulcanization accelerator other than thiazole-type vulcanization accelerators is cured under heat in the presence of, as an acid acceptor, a calcinated product of a hydrotalcite compound of the following formula $$M_x^{2+}Al_2(OH)_{2x+6-nz}(A^{n-})_z \cdot mH_2O \qquad (1)$$

wherein $M^{2+}$ represents at least one metal element selected from the group consisting of Mg and Zn, $A^{n-}$ represents an anion having a valence of n, m represents a positive number, and x and z represent positive numbers satisfying the following expressions $$12 > x \geq 2,$$

$$z \leq 2.$$

The cured product has improved water resistance.

6 Claims, No Drawings

METHOD FOR CURING HALOGEN-CONTAINING RUBBER COMPOSITION

CROSS-REFERENCE TO RELATED APPLICATIONS

This application is a continuation-in-part application of Ser. No. 505,291 filed on June 17, 1983, now abandoned.

BACKGROUND OF THE INVENTION

This invention relates to an improvement in a method for curing a curable rubber composition composed of a halogen-containing rubber and a member selected from the group consisting of a vulcanizing agent and a vulcanization accelerator other than thiazole-type vulcanization accelerators which comprises heating the composition in the presence of an acid acceptor. Specifically, it relates to a method for curing a curable halogen-containing rubber composition which can give a cured product having improved water resistance, chemical resistance, insulating property, etc.

More specifically, this invention pertains to an improved method which comprises heating the aforesaid curable rubber composition in the presence of, as an acid acceptor, a calcinated product of a hydrotalcite compound represented by the following formula (1)

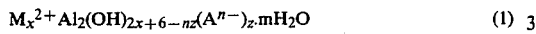

$$M_x^{2+}Al_2(OH)_{2x+6-nz}(A^{n-})_z \cdot mH_2O \quad (1)$$

wherein $M^{2+}$ represents at least one metal element selected from the group consisting of Mg and Zn, $A^{n-}$ represents an anion having a valence of n, m represents a positive number, and x and z represent positive numbers satisfying the following expressions $$12 > x \geq 2$$

$$z \leq 2,$$

thereby giving a cured product having improved water resistance.

Halogen-containing rubbers such as chlorinated polyethylene rubber, polychloroprene rubber and chlorinated butyl rubber are utilized as rubbers having particularly excellent weatherability and chemical resistance. Curing of the halogen-containing rubbers requires the use of an acid acceptor in addition to a vulcanization accelerator in order to cure them. Heretofore, magnesium hydroxide, calcium hydroxide, lead oxide, and other oxides, hydroxides, carbonates, etc. of elements of Groups II and IVa of the periodic table have been used as acid acceptors for this purpose.

Use of these acid acceptors, however, has various difficulties. For example, the use of compounds of elements of Group II of the periodic table as acid acceptors has the defect that the resulting cured rubber product has poor water resistance. This is presumably because strongly hygroscopic halides and/or basic halogen compounds of these elements are formed. Since poor water resistance at the same time means reduced insulating properties of the cured rubber product, lead compounds such as lead oxide have to be used as acid acceptors for uses which strongly require water resistance and chemical resistance.

The use of lead-containing acid acceptors, however, has the disadvantage that it gives cured products of poor mechanical strength and heat resistance because of the slow speed of vulcanization and the low degree of vulcanization, and in addition, the lead-containing acid acceptors have toxicity.

SUMMARY OF THE INVENTION

The present inventor made investigations in order to overcome the aforesaid defects of halogen-containing rubbers, which are attributed to acid acceptors. These investigations have led to the discovery that the aforesaid defects can be advantageously overcome by using the calcination products of the hydrotalcite compounds of formula (1) given hereinabove as acid acceptors, and that without a decrease in vulcanization speed or a decrease in the degree of vulcanization, cured products of halogen-containing rubbers having improved water resistance, chemical resistance, insulating properties, can be provided.

Inventors including the present inventor previously found that hydrotalcite-like crystalline compounds which partly overlap the compounds of formula (1) have excellent properties as a secondary vulcanization accelerator for thiazole-type rubber vulcanization accelerators, and disclosed them in Japanese Patent Publication No. 41653/1980. The present inventor has now found that the aforesaid defects of halogen-containing rubbers can be advantageously overcome by using the calcination products of the compounds of formula (1) as acid acceptors in the vulcanization of a curable composition of a halogen-containing rubber.

Investigations of the present inventor have led to the discovery that when a curable rubber composition composed of a halogen-containing rubber and a member selected from the group consisting of a vulcanizing agent and a vulcanization accelerator other than thiazole-type vulcanization accelerators is to be cured under heat in the presence of an acid acceptor, the use of the calcination product of the compound of formula (1) as the acid acceptor can lead to a cured product having excellent water resistance without involving undesirable retardation of vulcanization. The present inventor believes this to be presumably because the calcination product of the compound of formula (1) has a crystalline structure similar to dehydrated natural hydrotalcite $Mg_6Al_2(OH)_{16}CO_3$, or a solid solution of aluminum oxide and magnesium oxide, the anion $A^{n-}$ of the dehydrated compound has ion exchangeability, and the compound is alkaline.

Furthermore, the solid solution of aluminum oxide and magnesium oxide has the property of returning to the compound of formula (1), and during the course of returning, takes halogen and water into its crystal structure.

Since the compounds of metals of Group II of the periodic table as conventional acid acceptors inactivate acids generated during the vulcanization of halogen-containing rubbers, by a neutralization reaction, a very hygroscopic compound such as magnesium chloride forms and consequently, the water resistance of the cured product of the halogen-containing rubber is reduced. In contrast, the calcination product of the compound of formula (1) has low moisture absorption, and presumably because an acid formed during the vulcanization of a halogen-containing rubber is captured and inactivated by the calcination product of the compound of formula (1) by an ion exchange reaction, the calcination product exhibits an effect of markedly improving the water resistance of the cured halogen-containing rubber, as will be experimentally shown by Examples and Comparative Examples given hereinbelow.

It is an object of this invention therefore to provide an improved method for curing a curable halogen-containing rubber composition.

The above and other objects and advantages of the invention will become more apparent from the following description.

DESCRIPTION OF THE PREFERRED EMBODIMENT

The acid acceptor for halogen-containing rubbers which is used in the method of this invention is a calcination product of a hydrotalcite compound of the following formula (1)

$$M_x^{2+}Al_2(OH)_{2x+6-nz}(A^{n-})_z \cdot mH_2O \tag{1}$$

wherein $M^{2+}$ represents at least one metal element selected from the group consisting of Mg and Zn, $A^{n-}$ represents an anion having a valence of n, m represents a positive number, and x and z represent positive numbers satisfying the following expressions $$12 > x \geq 2, \text{ preferably } 6 > x > 2,$$

$$z \leq 2.$$

Examples of preferred anions $A^{n-}$ are $CO_3^{-2}$,

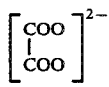

(an oxalate ion), $OH^-$ and $S^{2-}$.

Mg is preferred as the $M^{2+}$.

x is preferably $8 > x > 3$, more preferably $5 \leq x \leq 4$. z may be a positive number of 2 or smaller, for example, $0 \leq z \leq 2$.

m may be a suitable positive number, for example $0.5 \leq m \leq 5$.

The BET specific surface area of the compound of formula (1) may be properly chosen, and is preferably about 20 to about 100 m²/g. The particle diameter of the compound of formula (1) is preferably small to obtain good dispersibility in a rubber material. For example, it has a secondary particle diameter of about 0.1 to about 10 microns.

The calcination product of the hydrotalcite compound of formula (1) used in this invention has a BET specific surface area of, for example, about 20 to about 300 m²/g, preferably about 20 to about 200 m²/g, and a particle diameter of about 0.1 to about 10 microns.

The calcination product of the hydrotalcite compound of formula (1) can be represented by the following formula (2) or (3).

$$M_x^{2+}Al_2(OH)_{2x+6-nz}(A^{n-})_z \tag{2}$$

wherein $M^{2+}$, x, n and z are as defined in formula (1).

$$M_{1-x'}^{2+}Al_{x'}O_{1+\frac{1}{2}x'} \cdot m'H_2O \tag{3},$$

that is $$M_{1-x'}^{2+}Al_{x'}O_{(1+\frac{1}{2}x')-m'}(OH)_{2m'} \tag{3'}$$

wherein $M^{2+}$ is as defined in formula (1), and x' and m' represent numbers satisfying the following formulae.

$$0.1 \leq x' \leq 0.5, \text{ preferably } 0.2 < x' \leq 0.4$$

$$0 \leq m' < 1$$

The use of compounds of formula (3) is preferred.

Preferably, the calcination product is used after it is surface-treated with an anionic surface-active agent typified by higher fatty acids or alkali metal salts thereof in order to increase its compatibility with a rubber material. The amount of the surface-active agent adhering to, or adsorbed on, the surface may, for example, be about 0.5 to about 10% by weight, based on the weight of the calcination product.

The surface-treatment can be effected by, for example, contacting the calcination product in a solvent such as a lower alcohol, or a mixture thereof with the anionic surface-active agent or a coupling agent dissolved or suspended in the aforesaid solvent with stirring. It can also be carried out by mixing a melt of the surface-active agent and the calcination product with stirring. Examples of the anionic surface-active agent used in the surface-treatment include higher fatty acids or alkali metal salts of the formula

RCOOM wherein R is an alkyl group having 8 to 30 carbon atoms and M is hydrogen atom or an alkali metal atom, alkyl sulfates or salts of the formula

ROSO₃M wherein R and M are as defined above, alkylsulfonates or salts of the formula

RSO₃M wherein R and M are as defined above, alkylarylsulfonates or salts of the formula R-aryl-SO₃M wherein R and M are as defined above, and sulfosuccinate esters or salts of the formula

ROCOCH₂
|
ROCOCHSO₃M wherein R and M are as defined above.

These anionic surfactants can be used either alone or as a mixture of two or more.

Specific examples of the surface-active agent are higher fatty acids having 8 to 30 carbon atoms or alkali metal salts thereof, such as sodium stearate, potassium behenate, sodium montanate, potassium stearate, sodium oleate, potassium oleate, sodium palmitate, potassium palmitate, sodium laurate, potassium laurate, alkyl sulfates, alkyl sulfonates, alkylarylsulfonates or alkali metal salts thereof, such as sodium dilaurylbenzenesulfonate, potassium octadecylsulfate, sodium laurylsulfonate, or disodium 2-sulfoethyl α-sulfostearate. Examples of the coupling agent are titanium-type coupling agents such as isopropyl triisostearoyltitanate, isopropyl tridodecylbenzenesulfonyltitanate, isopropyl tris(dioctylpyrophosphate)titanate, and tetraoctyl bis(ditridecylphosphite)titanate; and silane-type coupling agents such as β-(3,4-epoxycyclohexyl)ethyltrimethoxysilane, vinyltriethoxysilane and γ-aminopropyl-trimethoxysilane.

In the present invention, the calcination product of formula (1) is used as the acid acceptor. The calcination product may, for example, be one which is obtained by calcination at a temperature of up to about 900° C., preferably up to about 800° C., preferably about 200° to about 900° C., more preferably about 300° to about 800° C. The amount of the acid acceptor used in this invention can be properly selected. For example, it is about 1 to about 40 parts by weight, preferably about 2 to about 30 parts by weight, especially preferably about 5 to about 20 parts by weight, per 100 parts by weight of the halogen-containing rubber.

In the curable rubber composition used in this invention which is composed of a halogen-containing rubber and a member selected from the group consisting of a vulcanizing agent and a vulcanization accelerator other than thiazole-type vulcanization accelerators, the vulcanizing agent may be any known vulcanizing agent. Examples of the vulcanizing agent include inorganic sulfur vulcanizers such as powdery sulfur, precipitated sulfur, colloidal sulfur, insoluble sulfur, highly dispersed sulfur, sulfur monochloride and sulfur dichloride; organic sulfur-containing compounds such as dipentamethylenethiuram tetrasulfide (DPTT) and 4,4′-dithiomorpholine; organic peroxides such as dicumyl peroxide and di-tert-butyl peroxide; quinonedioximes such as p-quinonedioxime and p,p′-dibenzoylquinonedioxime; organic polyamines such as triethylenetetramine, hexamethylenediamine carbamate, N,N′-dicinnamylidene-1,6-hexadiamine and 4,4′-methylenebis-o-chloroaniline; modified phenolic resins; tetrachloro-p-benzoquinone; isocyanates; metal peroxides such as lead peroxide and zinc peroxide.

The vulcanization accelerator used in the curable rubber composition may, for example, be any known accelerator which is other than thiazole-type vulcanization accelerators such as 2-mercaptobenzothiazole (MBT), its metal salts or hexylamine salt, dibenzothiazyl disulfide (MBTS) and 2-(2,4-dinitrophenylthio)benzothiazole (DPBT).

Examples of the vulcanization accelerator used in this invention include aldehyde-amine type vulcanization accelerators such as hexamethylenetetramine (H) and acetaldehyde-ammonia (AA); aldehyde-amine type vulcanization accelerators such as the reaction product (BAA) of n-butyl aldehyde and aniline; guanidines such as diphenylguanidine (DPG), diortho-tolylguanidine (DOTG) and ortho-tolylbiguanide (DTBG); thioureas such as thiocarbanilide (CA), diortho-tolylthiourea (DOTU), ethylenethiourea (EU), diethylthiourea (DEU), trimethylthiourea (TMU) and 2-mercapto-2-imidazoline; sulfenamides such as N-cyclohexyl-2-benzothiazole sulfenamide (CBS), N-t-butyl-2-benzothiazole sulfenamide (BBS), N,N′-diisopropyl-2-benzothiazole sulfenamide (DBS), and N,N′-diisopropyl-2-benzothiazole sulfenamide (DPBS); thiurams such as tetramethylthiuram monosulfides (TMTM), tetramethylthiram disulfide (TMTD), tetraethylthiuram disulfide (TETD), tetrabutylthiram disulfide (TBTD) and dipentamethylenethiuram tetrasulfide; dithiocarbamate salts such as sodium dimethyldithiocarbamate (NaMDC), sodium diethyldithiocarbamate (NaEDC), sodium di-n-butyldithiocarbamate (NaBDC), lead dimethyldithiocarbamate (PbMDC), zinc dimethyldithiocarbamate (ZnMDC), zinc diethyldithiocarbamate (ZnEDC), zinc di-n-butyldithiocarbamate (ZnBDC), zind pentamethylenedithiocarbamate (ZnPDC), zinc ethylphenyldithiocarbamate (ZnEPDC), tellurium diethyldithiocarbamate (TeEDC), selenium dimethyldithiocarbamate (ZeMDC), selenium diethyldithiocarbamate (SeEDC), copper dimethyldithiocarbamate (CuMDC), iron dimethyldithiocarbamate (FeMDC), diethylamine diethyldithiocarbamate (EAEDC), piperidine pentamethylenedithiocarbamate (PPDC) and pipecoline methylpentamethylenedithiocarbamate; and xanthogenate salts such as sodium isopropylxanthogenate (NaPX), zinc isopropylxanthogenate (ZnPX) and zinc butylxanthogenate (ZnBX).

The amount of the vulcanizing agent used is, for example, about 0.1 to about 10% based on the weight of the halogen-containing rubber, and the amount of the vulcanization accelerator used is, for example, about 0.1 to about 10% based on the weight of the halogen-containing rubber.

The curable rubber composition may contain various compounding agents known in the art such as fillers, reinforcing agents, plasticizers, processing aids, crosslinking agents, antioxidants, pigments and fire retardants. These compounding agents may be used in amounts generally known in the art. For examples the amounts may be about 5 to about 200% for the fillers, about 5 to about 150% for the reinforcing agents, about 1 to about 20% for the plasticizers, about 1 to about 10% for the processing aids, about 0.1 to about 10% for the crosslinking agents, about 0.1 to about 10% for the antioxidants, about 0.1 to about 10% for the pigments and about 1 to about 200% for the fire retardants, each based on the weight of the halogen-containing rubber.

Examples of the fillers include carbon blacks, silicic anhydride, hydrous silicic acid, calcium silicate, aluminum silicate, clay, talc, calcium carbonate, basic magnesium carbonate, alumina hydrate, diatomaceous earth, barium sulfate, mica, alumina sulfate, lithopone, asbestos and graphite.

Examples of the reinforcing agents include high-styrene resins, coumarone-indene resin, phenolic resins, modified melamine resins, petroleum resins, lignin, cotton, rayon, nylon, Vinylon, polyesters, glass fibers, carbon fibers and steel cords.

Examples of the plasticizers include pine tar, tall oil, rapeseed oil, cottonseed oil, peanut oil, castor oil, palm oil, mineral oil-type softeners, phthalic acid derivatives (e.g., DBP, DHP, DOP, and DIDP), sebacic acid derivatives such as DES and DOS and adipic acid derivatives (such as DOA and DIOA).

Examples of the processing aids include mold releasing agents such as silicone emulsions, silicone oils, silicone varnishes and silicone greases; dusting agents such as Powders of talc and mica and metallic soaps (e.g., zinc stearate), agents for regenerating scorched compounds, such as Struktol WB212 (a mixture of high-molecular-weight fatty acid esters) and RP-10 (dixylyl disulfide mixture); and rubber hardening agents such as benzidine, p-aminophenol and p-phenylenediamine.

Examples of the crosslinking agents are zinc oxide, magnesium oxide and lead monoxide.

Examples of the antioxidants include 2,2′-methylenebis(4-methyl-6-t-butylphenol), N,N′-diphenyl-p-phenylenediamine (DPPD), N,N′-dinaphthyl-p-phenylenediamine (DNPD), N-isopropyl-N′-phenyl-p-phenylenediamine (IPPD), N-octyl-N′-phenyl-p-phenylenediamine (DPPD), 2,2,4-trimethyl-1,3-dihydroquinoline (TMDQ), 6-ethoxy-2,2,4-trimethyl-1,2-dihydroquinoline (ETMDQ), N-phenyl-1-naphthylamine (PAN), octylated diphenylamine (ODPA), 2,6-di-t-butyl-4-methylphenol (DTBMP) and a condensation product between acetone and diphenylamine.

Examples of the pigments include titanium white, zinc oxide, lithopone, zinc sulfide, red iron oxide, cadmium red, minium, cadmium yellow, barium yellow, strontium yellow, chrome yellow, ultramarine, Prussian blue, cobalt blue, chromium oxide, cobalt green, carbon black, Hansa Yellow G, Lake Red C, benzidine orange, phthalocyanine blue, and phthalocyanine green.

Examples of the fire retardants include aluminum hydroxide, magnesium hydroxide, antimony trioxide, tetrabromobisphenol A, chlorinated paraffin, tricresyl phosphate, triethyl phosphate, perchloropentacyclodecane and chlorinated polyphenyl.

In the present invention, the heat-curing of the curable rubber composition of this invention may be carried out by methods known per se.

For example, the kneaded compound is molded by such means as calendering, extrusion, and intermixing, and then cured at a temperature of about 100° to about 250° C. and a pressure of about 1 to about 1,000 kg/cm$^2$ for a period of about 30 seconds to about 24 hours by various curing methods such as press curing, curing in a can, curing during injection molding, LCM curing, oven curing, continuous curing, etc.

The halogen-containing rubbers used in this invention are known and can be properly selected. Examples include halogen-containing olefin rubbers such as chlorinated polyethylene rubber, chlorinated polypropylene rubber, chlorosulfonated polyethylene rubber, chlorinated ethylene/propylene rubber, chlorinated ethylene/propylene/diene rubber, chlorinated ethylene/1-butene rubber, chlorinated ethylene/4-methylpentene rubber, chlorinated butyl rubber, and brominated butyl rubber; epihalohydrin rubbers such as polyepichlorohydrin rubber, epichlorohydrin/ethylene oxide copolymer rubber and epichlorohydrin/allyl glycicyl ether copolymer rubber; fluorine rubbers; chlorine-containing acrylic rubbers; polychloroprene rubbers; and polyvinyl chloride.

The following examples illustrate the method of this invention in greater detail.

EXAMPLES 1 AND 2 AND COMPARATIVE EXAMPLES 1 AND 2

In accordance with the compounding recipe shown in Table 1, chlorosulfonated polyethylene rubber and the other various ingredients shown therein were mixed, masticated by a roll, and then cured at 160° C. for 30 minutes.

TABLE 1

| Compounding ingredients | Amounts (parts by weight) |
|---|---|
| Chlorosulfonated polyethylene (Hypalon 40) | 100 |
| NBC (antioxidant) | 3 |
| Hard clay | 60 |
| FEF black | 15 |
| Process oil (Kenflex A) | 75 |
| Vaseline | 3 |
| Microcrystalline wax | 2 |
| Accelerator (TRA) | 2 |
| Acid acceptor (see Table 2) | 10 |

*NBC: nickel dibutyldithiocarbamate
*TRA: dipentamethylenethiuram tetrasulfide

The vulcanized product was dipped in hot water at 70° C. for 7 days, and the increase (%) of its volume was measured. Larger volumes mean higher water absorption and lower water resistance.

The results are shown in Table 2.

TABLE 2

| Run | Acid acceptor | Increase (%) in volume after dipping in hot water at 70° C. for 7 days |
|---|---|---|
| Example 1 (*1) | $Mg_4Al_2(OH)_{13}CO_3$ | 3.5 |
| Example 2 (*2) | $Mg_8Al_2(OH)_{20}CO_3$ | 4.7 |
| Comparative Example 1 | Magnesium oxide | 62.8 |
| Comparative Example 2 | Lead oxide | 11.5 |

(*1): The acid acceptor was surface-treated in an aqueous medium with 3.5%, based on the weight of the acid acceptor, of sodium stearate. Calcination product obtained by calcination at 300° C. for 1 hour.
(*2): The acid acceptor was surface-treated in an aqueous medium with 2.4%, based on the weight of the acid binder, of sodium oleate. Calcination product obtained by calcination at 250° C. for 1 hour.

EXAMPLE 3 AND COMPARATIVE EXAMPLE 3 AND 4

In accordance with the compounding recipe shown in Table 3, chlorinated polyethylene rubber (chlorine content 40% by weight) and the other compounding ingredients shown in Table 3 were mixed, masticated by a roll, and then cured at 155° C. for 30 minutes. The vulcanized product was dipped in hot water at 70° C. for 7 days, and then its increase in volume was measured. The results are shown in Table 4.

TABLE 3

| Compounding ingredients | Amounts (parts by weight) |
|---|---|
| Chlorinated polyethylene | 100 |
| Filler (carbon black) | 50 |
| Plasticizer (DOP) | 30 |
| Vulcanizer (sulfur) | 1 |
| Vulcanization accelerator (2-mercaptoimidazoline) | 2 |
| Acid acceptor (shown in Table 4) | 10 |

*DOP: dioctyl phthalate

TABLE 4

| Run | Acid acceptor | Volume increase (%) |
|---|---|---|
| Example 3 (*3) | $Mg_{5/7}Al_{2/7}O_{8/7}$ | 2.1 |
| Comparative Example 3 | Magnesium oxide | 16.2 |
| Comparative Example 4 | Magnesium hydroxide | 15.1 |

(*3): Calcination product obtained by calcinating $Mg_5Al_2(OH)_{14}CO_3.4H_2O$ at 500° C. for 1.5 hours. Then, 3%, based on the weight of the acid acceptor, of a melt of stearic acid was added with stirring to the acid acceptor for surface treatment.

EXAMPLES 4 AND 5 AND COMPARATIVE EXAMPLES 5 AND 6

Fluorine rubber (Daiel G-501) and the other compounding ingredients were mixed in accordance with the compounding recipe shown in Table 5, masticated, and cured at 150° C. for 30 minutes. The tensile strength of the vulcanized product is shown in Table 6.

The vulcanized product was dipped in hot water at 90° C. for 16 days, and thereafter its increase in volume was measured. The results are shown in Table 6.

The results show that lead oxide gave better water resistance than magnesium oxide, but inferior tensile strength because of poor vulcanizability, and that in contrast, the hydrotalcite compounds produced excellent results both in vulcanizability and water resistance.

TABLE 5

| Compounding ingredients | Amounts (parts by weight) |
|---|---|
| Fluorine rubber (Daiel G-501) | 100 |
| Carbon black | 20 |
| Vulcanizer (N,N'—dicinnamylidene-1,6-hexadiamine) | 3 |
| Acid acceptor (shown in Table 6) | 15 |

TABLE 6

| Run | Acid acceptor | Volume increase (%) | Tensile strength (kg/cm$^2$) |
|---|---|---|---|
| Example 4 (*4) | Mg$_{0.6}$Al$_{0.4}$O$_{1.2}$ | 1.8 | 195 |
| Example 5 (*5) | Zn$_{\frac{1}{3}}$Al$_{\frac{1}{3}}$O$_{7/6}$ | 2.5 | 203 |
| Comparative Example 5 | Magnesium oxide | 5.8 | 185 |
| Comparative Example 6 | Lead oxide | 2.8 | 140 |

(*4): Calcined product obtained by calcinating Mg$_3$Al$_2$(OH)$_{10}$CO$_3$.1.7H$_2$O at 700° C. for 1 hour. The acid acceptor was surface-treated with 2%, base on the weight of the acid acceptor, of isopropyltriisostearoyltitanate.

(*5): Calcination product obtained by calcinating

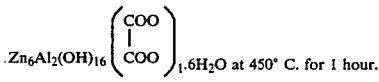

.Zn$_6$Al$_2$(OH)$_{16}$ $\begin{pmatrix} \text{COO} \\ | \\ \text{COO} \end{pmatrix}$ .6H$_2$O at 450° C. for 1 hour.

The acid acceptor was surface-treated with 1.5%, based on the weight of the acid acceptor, of β-(3,4-epoxycyclohexyl)-ethyltrimethoxysilane.

What is claimed is:

1. In a method for curing a curable rubber composition composed of a halogen-containing rubber and a member selected from the group consisting of a vulcanizing agent and a vulcanization accelerator other than thiazole-type vulcanization accelerators under heat in the presence of an acid acceptor, the improvement wherein said composition is cured under heat in the presence of, as said acid acceptor, a calcinated product of a hydrotalcite compound, obtained by calcination at a temperature of 200° C. to 900° C., of the following formula $$M_x^{2+}Al_2(OH)_{2x+6-nz}(A^{n-})_z \cdot mH_2O \quad (1)$$

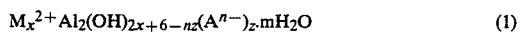

wherein $M^{2+}$ represents at least one metal element selected from the group consisting of Mg and Zn, $A^{n-}$ represents an anion having a valence of n, m represents a positive number, and x and z represent psotive numbers satisfying the following expressions $$12 > x \leqq 2,$$

$$z \leqq 2,$$

thereby giving a cured product having increased water resistance.

2. The method of claim 1 wherein the amount of the calcination product is about 1 to about 40 parts by weight per 100 parts by weight of the halogen-containing rubber.

3. The method of claim 1 wherein the amount of the vulcanizing agent is about 0.1 to about 10% based on the weight of the halogen-containing rubber.

4. The method of claim 1 wherein the amount of the vulcanization accelerator is about 0.1 to about 10% based on the weight of the halogen-containing rubber.

5. The method of claim 1 wherein the curing is carried out at about 10° to about 250° C.

6. The method of claim 1 wherein the calcination product is surface-treated with an anionic surface-active agent.

* * * * *